(12) United States Patent
Ma

(10) Patent No.: US 8,357,456 B2
(45) Date of Patent: Jan. 22, 2013

(54) RAPID DRYING LACQUERS

(75) Inventor: Sheau-Hwa Ma, West Chester, PA (US)

(73) Assignee: E I du Pont de Nemours and Company, Wilmington, DE (US)

(*) Notice: Subject to any disclaimer, the term of this patent is extended or adjusted under 35 U.S.C. 154(b) by 197 days.

(21) Appl. No.: 12/808,416

(22) PCT Filed: Dec. 22, 2008

(86) PCT No.: PCT/US2008/087944
§ 371 (c)(1),
(2), (4) Date: Jun. 16, 2010

(87) PCT Pub. No.: WO2009/086267
PCT Pub. Date: Jul. 9, 2009

(65) Prior Publication Data
US 2011/0117379 A1     May 19, 2011

Related U.S. Application Data

(60) Provisional application No. 61/009,365, filed on Dec. 28, 2007.

(51) Int. Cl.
*B32B 27/30* (2006.01)
*B05D 3/02* (2006.01)
*B05D 7/00* (2006.01)
*C08F 290/06* (2006.01)

(52) U.S. Cl. ............ 428/522; 524/558; 427/385.5; 427/407.1

(58) Field of Classification Search ............ None
See application file for complete search history.

(56) References Cited

U.S. PATENT DOCUMENTS

| | | | | |
|---|---|---|---|---|
| 4,038,264 | A * | 7/1977 | Rostoker et al. | 526/286 |
| 6,472,463 | B1 * | 10/2002 | Ma | 524/504 |
| 6,852,803 | B2 * | 2/2005 | Ma | 525/278 |
| 7,402,624 | B2 * | 7/2008 | Ma | 524/504 |

* cited by examiner

*Primary Examiner* — Sheeba Ahmed
(74) *Attorney, Agent, or Firm* — Brian J Myers

(57) ABSTRACT

Disclosed is a solventborne coating composition that provides a high quality basecoat especially for automotive substrates, methods for forming a layer of the solventborne coating composition and substrates coated with the coating composition. The coating composition contains an acrylic polymer that has both acid functional groups and polyether functional groups.

22 Claims, No Drawings

RAPID DRYING LACQUERS

FIELD OF THE INVENTION

This invention is related to a coating composition that comprises a solventborne coating composition containing an acrylic copolymer, especially for automotive finishes. The basecoating composition provides a coating having good chip resistance, adhesion and appearance.

DESCRIPTION OF THE RELATED ART

Basecoating compositions are important parts of automotive finishes in both the Original Equipment Manufacturers (OEM) market and the refinish market. Basecoating compositions provide the color for the finished article and typically comprise film forming binder; pigment dispersion; carrier liquid, either aqueous or organic solvent; and optionally, crosslinking agent. Most current basecoat compositions are applied as one or more thin layers, allowed to dry for a short period of time, and then coated with one or more layers of a clearcoat composition. The applied layers are then dried and optionally baked to form a durable protective coating on a vehicle. The clearcoat layer provides a glossy protective finish for the underlying layers.

The film forming binder of the basecoat must be a strongly cohesive film that is able to provide resistance to chipping damage, it must provide strong adhesion to both the primer layer and the overlying clearcoat, and must not interfere with the ability of the pigment dispersant to keep the pigment particles stabilized. Many of the desired properties are fulfilled in a crosslinking basecoat system. However, the economics of crosslinking basecoat systems are not desirable. To form a refinish crosslinkable system, a crosslinkable coating composition is mixed with a crosslinking component, usually a polyisocyanate, to form a pot mix. The pot mix has a limited shelf life before it forms a gel and is unusable. In a refinish body shop, the autobody repair technician must blend several color tints to form the desired repair color that must provide a very close match to the undamaged sections of the vehicle. If the color variation between the repair color and the undamaged portion of the vehicle is too large, small amounts of tints are added to move the color value so that differences in color are indistinguishable. If a crosslinked system is used to repair the damage, the composition can become too viscous to apply or may even gel before the correct color tint is found. This results in excessive costs to the repair shop as the material cannot be used and must be discarded.

Most refinish basecoat systems are therefore uncrosslinked lacquer systems. An uncrosslinked basecoat system will give the autobody repair technician essentially an unlimited time to find the correct color match. However, uncrosslinked basecoat systems can have lower levels of adhesion and chip resistance.

It is an object of the current invention to provide a solventborne lacquer that has excellent appearance, adhesion and chip resistance when applied to the surface of an automobile and subsequently coated with one or more layers of clearcoat composition followed by curing the applied clearcoat layer.

SUMMARY OF THE INVENTION

The present disclosure relates to a solventborne basecoating composition comprising;
A) at least one solventborne acrylic copolymer which is a random copolymer comprising;
  i) 2 percent to 10 percent by weight of a carboxylic acid monomer;
  ii) 1 percent to 5 percent of a polyether functional monomer, wherein the percents by weight are based on the total weight of the acrylic copolymer;
B) pigment; and
C) organic solvent,
and wherein the solventborne basecoat composition is substantially free from water.

The present disclosure also relates to a method for coating a substrate comprising the step of applying a solventborne coating composition to a substrate wherein the coating composition comprises;
  i. at least one solventborne acrylic copolymer which is a random copolymer comprising;
    1. 2 percent to 10 percent by weight of a carboxylic acid monomer;
    2. 1 percent to 5 percent of a polyether functional monomer, wherein the percents by weight are based on the total weight of the acrylic copolymer;
  ii. pigment; and
  iii. organic solvent,
and wherein the solventborne basecoat composition is substantially free from water.

The present disclosure also relates to a substrate coated by a layer of a basecoat composition said basecoating composition comprising;
  i. at least one solventborne acrylic copolymer which is a random copolymer comprising;
    1. 2 percent to 10 percent by weight of a carboxylic acid monomer;
    2. 1 percent to 5 percent of a polyether functional monomer, wherein the percents by weight are based on the total weight of the acrylic copolymer;
  ii. pigment; and
  iii. organic solvent,
and wherein the solventborne basecoat composition is substantially free from water.

DETAILED DESCRIPTION OF THE INVENTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

The phrase "substantially free from water" means that the composition primarily contains volatile organic solvents and is free from water added as a solvent component. It is possible that certain components added to the composition have water as a carrier liquid. According to the definition used herein, water is a minor component of the carrier liquid of the coating composition and it is not added as a separate ingredient to the coating composition. Preferably, the coating composition contains less that 5 percent by weight water, and more preferably, the coating composition contains less than 1 percent by weight of water. All percents by weight are based upon the total weight of the coating composition.

The coating composition according to the present invention is a solventborne coating composition that is substantially free from water. The coating composition comprises at least one acrylic polymer, a pigment dispersion and organic solvent. In one embodiment, the solventborne coating composition is a lacquer. In another embodiment, the solventborne coating composition is a crosslinked coating composition.

In order to enhance the physical properties, it is important that the acrylic polymer contain functional groups that are able to interact with each other to provide at least some intermolecular bonding, such as, for example, hydrogen bonding. However, it is possible that too much hydrogen bonding in the film forming binder can interfere with the pigments in the pigment dispersion, as pigments tend to have strong interactions with polar molecules. In a non-crosslinked film forming binder system (i.e., a lacquer), choosing the functional groups and their respective amounts so that the functional groups do not interfere with the pigment dispersion yet provide all the desired properties continues to be a challenge. It has been found that a combination of carboxylic acid functional groups and polyether groups can provide the necessary intermolecular interactions without interfering with the pigment dispersion. It is unusual for solventborne coating compositions to contain polymers having polyether functional monomers. Polyether functional monomers are typically used in waterborne coating compositions to help impart water solubility or water dispersability to the film forming resins. It is theorized that the combination of the carboxylic acid and the polyether functional groups can interact with one another and provide strong polymer/polymer interactions that enhance the properties of the dried film so that a crosslinking agent is not necessary. If a crosslinking agent is used with the present coating composition, it can be possible to use a smaller amount of the crosslinking agent due to the strong interactions between the carboxylic acid and polyether functional groups.

The acrylic polymer of the coating composition is a random copolymer that comprises in the range of from 2 percent to 10 percent by weight of a carboxylic acid functional monomer and in the range of from 1 percent to 5 percent by weight of a polyether functional monomer. The acrylic polymer also comprises in the range of from 85 percent to 97 percent of monomers that are not carboxylic acid or ether functional monomers. All percents by weight are based on the total weight of the acrylic polymer.

The acrylic polymer of the present invention has a number average molecular weight in the range of from 9,000 to 16,000 and a weight average molecular weight in the range of from 25,000 to 55,000. The acrylic polymer has a Tg in the range of from −10° C. to 80° C.

The carboxylic acid functional monomer can be chosen from the group consisting of acrylic acid, methacrylic acid, maleic acid, fumaric acid, maleic acid mono alkyl ester, fumaric acid mono alkyl ester or a combination thereof.

The polyether functional monomer is a monomer having the formula of

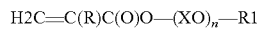

$H_2C=C(R)C(O)O-(XO)_n-R1$ wherein R is H or CH3; X is an alkyl group having in the range of from 2 to 4 carbon atoms; n is from 2 to 10; and R1 is H or an alkyl group having in the range of from 1 to 6 carbon atoms. Preferably, X is chosen from —CH$_2$CH$_2$—. One preferred example of a polyether functional monomer is ethoxy triethylene glycol methacrylate.

The remainder of the monomers in the acrylic polymer can include acrylic and methacrylic acid esters having in the range of from 1 to 20 carbon atoms such as, for example, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, 2-ethyl hexyl acrylate, 2-ethyl hexyl methacrylate, isobornyl acrylate, isobornyl methacrylate; vinyl esters of carboxylic acids having in the range of from 1 to 20 carbon atoms, such as, for example, vinyl acetate, vinyl propionate, vinyl laurate, vinyl stearate; vinyl aromatics such as, for example, styrene, alpha-methyl styrene, 4-methyl styrene; vinyl ethers such as, for example, vinyl methyl ether, vinyl isobutyl ether; acrylonitrile; methacrylonitrile; acrylamide, methacrylamide; functionalized acrylic acid esters and functionalized methacrylic acid esters such as, for example, 2-hydroxyethyl acrylate, 2-hydroxy ethyl methacrylate, 2-hydroxy propyl acrylate, 2-hydroxy propyl methacrylate, 3-hydroxy propyl acrylate, 3-hydroxy propyl methacrylate, 4-hydroxy butyl acrylate, 4-hydroxyl butyl methacrylate. Combinations of any of the above are preferred.

The acrylic polymer can be prepared by a variety of solution polymerization methods in which the monomers are blended with a liquid reaction medium, a free radical polymerization initiator and optionally a chain transfer agent, and heated to 75° C. to 165° C. for a sufficient time, typically for 2 to 8 hours to form a polymer.

As indicated above, the free radical polymerization portion of the process used herein to form the acrylic polymer is preferably carried out using conventional techniques, such as by heating the monomers in the presence of a free radical polymerization initiator, typically, tertiary butyl perbenzoate, tertiary butyl peroctoate, cumene hydroperoxide, benzoyl peroxide, di-tertiary butylperoxide, di-cumene peroxide, methyl ethyl ketone peroxide or similar peroxygen compounds, or an azo compound such as azobisisobutyronitrile is employed. The amount of free radical polymerization initiator can be varied depending upon the desired molecular weight but 0.05-8% by weight based on the weight of total polymerizable monomer is typical. A preferred range is from 0.05 to 4 percent by weight. A mixture of two or more initiators may be used.

A solvent is not essential but is preferably used as the liquid reaction medium. The solvent can be used at from 0 to about 75% by weight of the total reaction mixture. Typical solvents which are used to prepare the acrylic polymer are the following: toluene, ethyl acetate, buytl acetate, acetone, methyl isobutyl ketone, methyl ethyl ketone, methyl amyl ketone, mineral spirits, ethylene glycol monoether acetates and other aliphatic, cycloaliphatic and aromatic hydrocarbons, esters, ethers, ketones, and a combination thereof.

Coating compositions according to the present invention can also include at least one pigment dispersion. A pigment dispersion typically consists of a pigment dispersant resin, a carrier liquid and pigment. The pigment dispersant resin suspends or disperses the pigment particles in the carrier medium and prevents their re-agglomeration on storage. It is desirable that the pigment dispersion remains substantially stable, e.g., showing minimal pigment settling and viscosity change with time, prior to its use in the preparation of the coating composition.

Pigments are typically available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process the pigment agglomerates are broken down into smaller agglomerates and/or individual particles the surfaces of which are wetted by the pigment dispersant resin.

Suitable pigments for use with the present invention include, for example, metal oxides such as titanium dioxide, zinc oxide, iron oxides of various colors; carbon black; filler pigments such as talc, china clay, barytes, carbonates, silicates; and organic colored pigments such as quinacridones, phthalocyanines, perylenes, azo pigments, indanthrone blues, carbazoles such as carbazole violet, isoindolinones, isoindolones, thioindigo reds, benzimidazolinones, diketo-pyrrolo-pyrroles (DPP), or a combination thereof.

Also suitable are metallic effect pigments such as, for example, aluminum flakes, copper bronze flakes, pearlescent flakes, and optional other effect pigments, holographic flakes, glass spheres, glass flakes, other non-flake effect pigments including micro titanium dioxide pigments and GRAPHITAN® pigments, and higher degree effect pigments including, for instance, CHROMAFLAIR®, VARIOCHROME®, and HELICONE® pigments or a combination thereof.

The present coating composition also comprises organic solvent. Organic solvents useful for coating compositions are known to those of ordinary skill in the art and include, ketones, such as, for example, methyl ethyl ketone, methyl amyl ketone, methyl isobutyl ketone, methyl propyl ketone, acetone; esters, such as, for example, ethylene glycol monobutyl ether acetate, butyl acetate, tert-butyl acetate and ethyl acetate, ethers, such as, for example, glycol ethers, alcohols such as ethylene glycol, isopropanol, and n-butanol; aromatic hydrocarbon solvents, such as toluene, xylene; VM&P naphtha; mineral spirits or a combination thereof.

Coating compositions of the present invention can include, as optional ingredients, any of the known coating composition additives. These include, for example, other film forming resins, light stabilizers, rheology control agents, and/or crosslinking agents.

Suitable film-forming resins include polyacrylates, polyesters, alkyd resins, polyethers, polyurethanes or a combination thereof. Polyesters are preferred.

Suitable polyacrylates are acrylic copolymers that have a different composition than the acrylic copolymer containing both carboxylic acid and polyether functional groups. Any of the monomers listed above can be used to form the polyacrylates.

Suitable alkyd resins and polyesters are linear or branched polyesters made by polymerizing di-, tri- or other polyols with di-, tri- or polycarboxylic acids, or anhydrides or lactones. Preferred polyesters are branched polyesters having a number average molecular weight in the range of from 1,000 to 30,000. Suitable polyols include, for example, ethylene glycol, propylene glycol, butylenes glycol, neopentyl glycol, diethylene glycol, glycerol, trimethylol propane, pentaerythritol and a combination thereof. Useful carboxylic acids and anhydrides include, for example, succinic acid, adipic acid, azelaic acid, sebacic acid, maleic acid, fumaric acid, tetrahydrophthalic acid, trimellitic acid, anhydrides thereof or a combination thereof. Epsilon caprolactone or other lactones can also be used. The polymerization product of dimethylol propionic acid, pentaerythritol, and ε-caprolactone is particularly useful.

Suitable polyethers are polyethers having repeat units from 1,2-ethylene glycol, 1,2-propylene glycol, 1,3-propane diol, 1,4-butane diol or a combination thereof. Useful polyethers have a weight average molecular weight in the range of from 500 to 5,000.

Suitable polyurethanes are prepared by reacting di-, tri- or other polyols with polyisocyanates such that the NCO:OH ratio is in the range of from 1.1:1 to 1:1.1. Any of the polyols listed above are useful. Suitable polyisocyanates include, for example, aliphatic diisocyanates and cycloaliphatic diisocyanates, having in the range of from 4 to 20 carbon atoms, aromatic diisocyanates or a combination thereof. Also useful are any of the diisocyanate adducts containing isocyanurate, allophanate, uretidione and/or biuret groups.

To improve weatherability of the coating, 0.1 to 5 weight percent, preferably 1 to 2.5 weight percent and more preferably 1.5 to 2.25 weight percent, based on the weight of the solids content of the coating composition, of an ultraviolet light stabilizer or a combination of ultraviolet light stabilizers and light absorbers can be added. These stabilizers include ultraviolet light absorbers, screeners, quenchers and specific hindered amine light stabilizers. Also, about 0.1 to 5% by weight, based on the total weight of the solids content of the coating composition, of an antioxidant can be added. Most of the foregoing stabilizers are supplied by Ciba Specialty Chemicals, Tarrytown, N.Y.

Rheology control agents can be present in the coating composition. Suitable rheology control agents include cellulose derivatives, including cellulose butyrate acetate (CAB); fumed silica, polyureas, bentonite or a combination thereof.

Crosslinking agents are optionally added to the coating composition. Crosslinking agents include, for example, melamine formaldehyde resins and polyisocyanates. If a crosslinking agent is used in a coating composition according to the present invention, it is preferred to use polyisocyanates.

Typical examples of polyisocyanates are isocyanate compounds having 2 to 4 isocyanate groups per molecule, such as 1,6-hexamethylene diisocyanate, isophorone diisocyanate, 2,4-toluene diisocyanate, diphenylmethane-4,4'-diisocyanate, dicyclohexylmethane-4,4'-diisocyanate, tetramethylxylidene diisocyanate, and the like. Polyisocyanates having isocyanurate structural units can also be used such as, for example, the isocyanurate of hexamethylene diisocyanate which is available under the tradename DESMODUR N-3390® from Bayer Corporation of Pittsburgh, Pa., the isocyanurate of isophorone diisocyanate which is available under the tradename DESMODUR Z-4470® from Bayer Corporation.

Polyisocyanate functional adducts can also be used that are formed from any of the forgoing organic polyisocyanate and a polyol. Polyols such as trimethylol alkanes like trimethylol propane or ethane can be used. When the crosslinkable resin of the present invention is used in exterior coatings, the use of an aliphatic or cycloaliphatic isocyanate is preferable to the use of an aromatic isocyanate, from the viewpoint of weatherability and yellowing resistance.

Melamine formaldehyde resins are also useful and many are available from Cytec Industries, Stamford, Conn., under the tradename of CYMEL® resins.

Polyisocyanate crosslinking agents are generally added to the coating composition just prior to applying the coating composition to the substrate. The mixture, including the polyisocyanates, is called a pot mix and typically has a short period of time before the pot mix gels. The gel time for a pot mix can range from minutes (about 30-45 minutes) to several hours (usually less than 8 hours). The current coating composition preferably does not contain a crosslinking agent.

Coating compositions of the present invention are preferably used as the basecoat in a basecoat/clearcoat system. More preferably, the coating compositions are used as the basecoat composition in repairing damaged automobiles. When used in this manner, an autobody repair person repairs the underlying substrate, then applies one or more layers of primer composition to provide a smooth surface. The applied primer composition is then optionally sanded to provide an exceptionally smooth surface. One or more layers of the basecoat composition according to the present invention are applied, followed by an optional flash-drying step. One or more layers of clearcoat composition are then applied to the basecoat composition. The clearcoat composition generally provides a glossy finish to the basecoat composition and protects the underlying substrate from mechanical damage.

The selection of the clearcoat composition is not particularly critical. Many clearcoat compositions are commercially available. One preferred example is CHROMAPREMIER® 7900S, available from Dupont, Wilmington, Del.

The basecoat composition can be applied to a substrate in any manner known to those of ordinary skill in the art. Suitable application methods include, for example, pneumatic spraying, electrostatic spraying, roller coating, dipping or brushing.

Suitable substrates for applying the coating composition of the present invention include automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, boats, and aircraft. The substrate further includes industrial and commercial new construction and maintenance thereof; cement and wood floors; leather; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; and sporting equipment.

EXAMPLES

Unless otherwise specified, all ingredients are available from the Aldrich Chemical Company, Milwaukee, Wis.

Tert-butyl peroctoate is available from Elf Atochem North America, Ltd., Philadelphia, Pa.

Ethoxy triethylene glycol methacrylate is available from

ANTI-TERRA U® is available from Byk Chemie, Wallingford, Conn.

SHELLSOL® 7 EC and SHELLSOL® D38 are available from Shell Chemical Co., Houston, Tex.

BENTONE® 34 is available from Elementis Specialties, London, United Kingdom.

SPARKLE SILVER® 5745 Aluminum paste is available from Silberline Manufacturing Co., Tamaqua, Pa.

CAB 381-20 and CAB 531-1 cellulose acetate butyrate are available from Eastman Chemical Company, Kingsport, Tenn.

The following monomer abbreviations are used in the examples:

Sty—styrene
IBOA—isobornyl acrylate
BA—n-butyl acrylate
BMA—n-butyl methacrylate
EHA—2-ethylhexyl acrylate
EHMA—2-ethylhexyl methacrylate
MMA—methyl methacrylate
HEA—2-hydroxyethyl acrylate
HEMA—2-hydroxyethyl methacrylate
AA—acrylic acid
ETEGMA—ethoxytriethyleneglycol methacrylate Polymer 1: MMA/BMA/BA/HEA/AA/ETEGMA (45/22/15/8/8/2% by weight)

A 12-liter flask was equipped with a thermometer, stirrer, addition funnels, heating mantel, reflux condenser and a means of maintaining a nitrogen blanket over the reactants. The flask was held under nitrogen positive pressure and the following ingredients were employed.

|  | Weight (gram) |
|---|---|
| Portion 1 | |
| Ethyl acetate | 495 |
| Isopropanol | 2160.4 |
| Portion 2 | |
| Butyl methacrylate (BMA) | 818.4 |
| Butyl acrylate (BA) | 558 |
| Methyl methacrylate (MMA) | 1674 |
| 2-Hydroxyethyl acrylate (HEA) | 297.6 |
| Acrylic acid (AA) | 297.6 |
| Ethoxytriethyleneglycol methacrylate (ETEGMA) | 74.4 |
| Portion 3 | |
| t-Butyl peroctoate | 67.64 |
| Ethyl acetate | 1182 |
| Portion 4 | |
| t-Butyl peroctoate | 6.76 |
| Ethyl acetate | 118.2 |

Portion 1 mixture was charged to the flask and the mixture was heated to reflux temperature and refluxed for about 20 minutes. Portion 2 and Portion 3 solution were simultaneously fed to the flask over 210 minutes, and the reaction mixture was held at reflux temperature throughout the course of additions. Reflux was continued for 30 minutes. Portion 4 was added over 10 minutes and the reaction mixture was refluxed for another 2 hours and the solution was cooled to room temperature and filled out. The resulting clear polymer solution had a solid content of about 49.4% and a Gardner-Holtz viscosity of X+½. The copolymer had a 50,966 Mw and 14,750 Mn, and a Tg of 46.4 C measured by Differential Scanning calorimetry (DSC).

Polymer 2: STY/IBOA/BA/EHA/MMA/HEA/AA/ETEGMA (10/12/20/12/30/8/6/2% by Weight)

A 12-liter flask was equipped as in Example 1. The flask was held under nitrogen positive pressure and the following ingredients were employed.

| | Weight (gram) |
|---|---|
| Portion 1 | |
| Ethyl acetate | 385.16 |
| Isopropanol | 1538.44 |
| Portion 2 | |
| Styrene (Sty) | 421.2 |
| Isobornyl acrylate (IBOA) | 505.44 |
| Butyl acrylate (BA) | 842.4 |
| 2-Ethylhexyl acrylate (EHA) | 505.44 |
| Methyl methacrylate (MMA) | 1263.6 |
| 2-hydroxyethyl acrylate (HEA) | 336.96 |
| Acrylic acid (AA) | 252.72 |
| Ethoxytriethyleneglycol methacrylate (ETEGMA) | 84.24 |
| Portion 3 | |
| t-Butyl peroctoate | 72 |
| Ethyl acetate | 1315 |
| Portion 4 | |
| t-Butyl peroctoate | 7.2 |
| Ethyl acetate | 131.5 |
| Portion 5 | |
| t-Butyl peroctoate | 7.2 |
| Ethyl acetate | 131.5 |

The procedure of Example 1 was repeated except that Portion 5 was fed to the reactor after the addition of Portion 4 and 30 minutes of reflux. The reaction mixture was then refluxed for another 2 hours. After cooling, the resulting clear polymer solution had a solid content of about 53.8% and a Gardner-Holtz viscosity of W+½. The copolymer had a 51,505 Mw and 14,459 Mn and a Tg of 24.3 C measured by DSC.

Polymer 3 (Comparative): Sty/IBOA/BA/EHA/MMA/HEA (10/16/20/16/30/8% by Weight

This example shows the preparation of a random copolymer without the acid functional groups and ethylene oxide groups that are critical to this invention.

A 12-liter flask was equipped as in Preparation 1. The flask was held under nitrogen positive pressure and the following ingredients were employed.

| | Weight (gram) |
|---|---|
| Portion 1 | |
| Methyl propyl ketone | 1592.4 |
| Portion 2 | |
| Styrene (Sty) | 465.3 |
| Isobornyl acrylate (IBOA) | 744.48 |
| Butyl acrylate (BA) | 930.6 |
| 2-Ethylhexyl acrylate (EHA) | 744.48 |
| Methyl methacrylate (MMA) | 1395.9 |
| 2-Hydroxyethyl acrylate | 372.24 |
| Portion 3 | |
| t-Butyl peroctoate | 38 |
| Methyl propyl ketone | 1220 |
| Portion 4 | |
| t-Butyl peroctoate | 3.8 |
| Ethyl acetate | 122 |
| Portion 5 | |
| t-Butyl peroctoate | 3.8 |
| Ethyl acetate | 122 |

The procedure of Example 2 was repeated. After cooling, the resulting clear copolymer solution had a solid content of about 58.1% and a Gardner-Holtz viscosity of U. The copolymer had a 47,869 Mw and 14,267 Mn, and a Tg of 20.8 C measured by.

Polymers 4-18

Polymer 4 to 18 including the Comparative Polymers 7 and 10 were prepared in a similar manner as described in Polymer 1. The results are summarized in TABLE 1 below.

TABLE 1

| | Composition | Solids | Visc* | Mn | Mw | PD |
|---|---|---|---|---|---|---|
| Polymer 4 | Sty/IBOA/BA/EHA/MMA/HEMA/AA/ETEGMA (10/20/20/12/25/8/3/2% by weight) | 55.2 | W + ½ | 12,373 | 48,594 | 3.93 |
| Polymer 5 | Sty/IBOA/BA/EHA/MMA/HEMA/AA/ETEGMA (10/20/20/12/25/8/3/2% by weight) | 56.0 | V | 11,295 | 39,223 | 3.47 |
| Polymer 6 | Sty/IBOA/BA/EHA/MMA/HEMA/AA/ETEGMA (10/20/20/12/25/8/3/2% by weight) | 55.6 | U + ½ | 9,295 | 30,269 | 3.26 |
| Polymer 7 (Comparative) | Sty/IBOA/BA/EHA/MMA/HEMA/AA (10/20/22/12/25/8/3% by weight) | 55.3 | W + ½ | 15,411 | 50,199 | 3.26 |
| Polymer 8 | Sty/CHMA/BA/EHA/MMA/HEA/AA/ETEGMA 10/17/20/12/25/8/4/4% by weight) | 55.6 | W + ½ | 14,275 | 48,954 | 3.43 |
| Polymer 9 | Sty/CHMA/BA/EHA/MMA/HEMA/HEMA/AA/ETEGMA (10/18/20/12/25/8/3/4% by weight) | 56.2 | X + ½ | 13,378 | 46,877 | 3.50 |
| Polymer 10 (Comparative) | Sty/CHMA/BA/EHA/MMA/HEA/AA (10/20/22/12/25/8/3% by weight) | 55.4 | Y + ½ | 14,043 | 46,272 | 3.30 |
| Polymer 11 | Sty/IBOA/BA/EHMA/MMA/HEA/AA/ETEGMA (10/18/20/12/25/8/3/4% by weight) | 55.4 | V + ½ | 12,880 | 49,635 | 3.85 |
| Polymer 12 | Sty/IBOA/BA/EHMA/MMA/HEA/AA/ETEGMA (10/20/20/12/25/8/3/2% by weight) | 55.4 | W | 13,124 | 48,471 | 3.69 |
| Polymer 13 | Sty/IBOA/BA/EHA/MMA/HEA/AA/ETEGMA (10/12/20/12/30/8/6/2% by weight) | 54.7 | W + ½ | 13,908 | 54,647 | 3.93 |
| Polymer 14 | Sty/IBOA/BA/EHA/MMA/HEA/AA/ETEGMA (10/17/20/12/25/8/4/4% by weight) | 55.6 | U + ½ | 12,006 | 45,138 | 3.76 |
| Polymer 15 | Sty/IBOA/BA/EHA/MMA/HEA/AA/ETEGMA (10/17/18/12/28/8/3/4% by weight) | 54.5 | U + ½ | 13,085 | 47,729 | 3.85 |

Polyester 1:

The following constituents were charged into a 12-liter flask equipped with mechanical stirring, a thermocouple, short path distillation head with a water separator under nitrogen flow;

| Ingredient | Amount (grams) |
|---|---|
| Dimethyol propionic acid | 1668.8 |
| Pentaerythritol | 67.6 |
| Tin (II) ethylhexanoate | 25.1 |
| ε-Caprolactone | 3337.6 |
| Xylene | 87.6 |

The reaction mixture was heated to its reflux temperature and water was collected in the water separator. The reaction progress was monitored from the amount of water collected and the temperature was not allowed to exceed 185° C. When the amount of water collected reached the theoretical amount of 224 grams, acid number measurements were used to determine the end point of the reaction, which was at an acid number of less than 5. At a measured acid number of 3, the reaction was allowed to cooled to 120° C. The reactor was held at 120° C. until reaction solids exceeded 95%. The reactor was then allowed to cool to 90° C. and the polymer solution was thinned with 2537.3 grams of methyl amyl ketone.

BENTONE® Dispersion A:

BENTONE® clay was pre-dispersed in the formula below using an overhead air mixer at high speed.

| Ingredient | Wt % |
|---|---|
| ANTI-TERRA U ® | 11.50 |
| Ethylene glycol | 1.72 |
| SHELLSOL ® 7 EC | 58.65 |
| BENTONE ® 34 | 5.76 |
| SHELLSOL ® 7 EC | 22.37 |
| Total | 100.00 |

It was then milled with 0.8 mm glass beads with an overhead agitator at 2200 rpm for 11 minutes.

Aluminum Flake Dispersion B:

The aluminum flake was dispersed in the formula below using an overhead air mixer at medium speed for 30 minutes.

| Ingredient | Wt % |
|---|---|
| Amyl acetate | 6.07 |
| SHELLSOL ® D38 | 5.35 |
| Butyl acetate | 5.90 |
| BENTONE ® dispersion A | 8.68 |
| Acrylic resin* (65%) | 38.95 |
| SPARKLE SILVER ® 5745 Aluminum Paste | 35.06 |
| Total | 100.01 |

*A random acrylic copolymer styrene/isobornyl acrylate/butyl acrylate/2-ethylhexyl acrylate/methyl metacrylate/2-hydroxylethyl methacrylate (10/15/15/15/25/20% by weight) at 66.4% solids in n-butyl acetate was prepared by the standard free radical polymerization method.

CAB Solution C:

CAB was pre-dissolved as a stock solution.

| Ingredient | Wt % |
|---|---|
| Butyl acetate | 59.17 |
| Methyl amyl ketone | 25.36 |
| CAB-531-1 | 15.47 |
| Total | 100.00 |

CAB Blend Solution D:

A blend of 2 CAB's was pre-dissolved as a stock solution.

| Ingredient | Wt % |
|---|---|
| Butyl acetate | 59.42 |
| Methyl amyl ketone | 25.46 |
| CAB 381-20 | 11.25 |
| CAB 531-1 | 3.87 |
| Total | 100.00 |

CAB Blend Solution E:

A blend of 2 CAB's at a different ratio from that of the Solution D was pre-dissolved as a stock solution.

| Ingredient | Wt % |
|---|---|
| Butyl acetate | 59.34 |
| Methyl amyl ketone | 25.43 |
| CAB 381-20 | 7.50 |
| CAB 531-1 | 7.73 |
| Total | 100.00 |

Solvent Blend F:

A solvent mixture was prepared to be used the reducer.

| Ingredient | Wt % |
|---|---|
| Acetone | 10 |
| Xylene | 25 |
| Methyl amyl ketone | 25 |
| Methyl isobutyl ketone | 10 |
| Butyl acetate | 30 |
| Total | 100 |

Preparation of Basecoat Compositions 1-65 (BC1-BC65)

To prepare basecoats, all ingredients, except Solvent Blend F, were mixed for 10 minutes using an air mixer at medium speed. Solvent Blend F was added and mixed in before spraying. Each polymer was tested in several different binder packages for formulation latitude or robustness of these polymers in typical basecoat formulas.

TABLE 2

| Ingredient | BC1 | BC2 | BC3 | BC4 | BC5 | BC6 | BC7 | BC8 | BC9 | BC10 | BC11 |
|---|---|---|---|---|---|---|---|---|---|---|---|
| Aluminum dispersion B | 43.59 | 43.59 | 43.59 | 43.59 | 43.59 | 43.59 | 43.59 | 43.59 | 43.59 | 43.59 | 43.59 |
| Polymer 1 | 179.11 | 138.62 | 148.74 | 148.74 | 88.02 | 98.14 | | | | | |
| Polymer 2 | | | | | | | 164.46 | 127.29 | 136.58 | 80.82 | 90.11 |
| Polymer 3 | | | | | | | | | | | |
| CAB Blend C | | 133.33 | | | 133.33 | | | 133.33 | | 133.33 | |
| CAB Blend D | | | 100.00 | | | | | | | | |
| CAB Blend E | | | | 100.00 | | 100.00 | | | 100.00 | | 100.00 |
| Polyester 1 | | | | | 38.46 | 38.46 | | | | 38.46 | 38.46 |
| Solvent Blend F | 317.92 | 211.68 | 238.98 | 238.98 | 232.83 | 260.13 | 364.56 | 247.77 | 277.71 | 255.75 | 285.69 |
| Total | 540.62 | 527.22 | 531.31 | 531.31 | 536.23 | 540.32 | 572.61 | 551.98 | 557.88 | 551.95 | 557.85 |

| Ingredient | BC12 | BC13 | BC14 | BC15 | BC16 | BC17 |
|---|---|---|---|---|---|---|
| Aluminum dispersion B | 43.59 | 43.59 | 43.59 | 43.59 | 43.59 | 43.59 |
| Polymer 1 | | | | | | |
| Polymer 2 | | | | | | |
| Polymer 3 | 152.39 | 117.95 | 126.56 | 126.56 | 74.89 | 83.50 |
| CAB Blend C | | 133.33 | | | 133.33 | |
| CAB Blend D | | | 100.00 | | | |
| CAB Blend E | | | | 100.00 | | 100.00 |
| Polyester 1 | | | | | 38.46 | 38.46 |
| Solvent Blend F | 402.28 | 276.97 | 309.04 | 309.04 | 274.29 | 306.36 |
| Total | 598.26 | 571.84 | 579.19 | 579.19 | 564.56 | 571.91 |

TABLE 3

| Ingredient | BC18 | BC19 | BC20 | BC21 | BC22 | BC23 | BC24 | BC25 |
|---|---|---|---|---|---|---|---|---|
| Aluminum dispersion B | 43.59 | 43.59 | 43.59 | 43.59 | 43.59 | 43.59 | 43.59 | 43.59 |
| Polymer 4 | 160.29 | 124.06 | 133.12 | 87.83 | | | | |
| Polymer 5 | | | | | 158.00 | 122.29 | 131.21 | 86.57 |
| Polymer 6 | | | | | | | | |
| Polymer 7 | | | | | | | | |
| CAB Solution C | | 133.33 | | | | 133.33 | | |
| CAB Solution E | | | 100.00 | 100.00 | | | 100.00 | 100.00 |
| Polyester 1 | | | | 38.46 | | | | 38.46 |
| Solvent Blend F | 372.22 | 253.71 | 284.08 | 289.88 | 383.41 | 262.36 | 293.36 | 296.01 |
| Total | 576.10 | 554.69 | 560.79 | 559.76 | 585.00 | 561.57 | 568.16 | 564.63 |

| Ingredient | BC26 | BC27 | BC28 | BC29 | BC30 | BC31 | BC32 | BC33 |
|---|---|---|---|---|---|---|---|---|
| Aluminum dispersion B | 43.59 | 43.59 | 43.59 | 43.59 | 43.59 | 43.59 | 43.59 | 43.59 |
| Polymer 4 | | | | | | | | |
| Polymer 5 | | | | | | | | |
| Polymer 6 | 159.02 | 123.08 | 132.06 | 87.13 | | | | |
| Polymer 7 | | | | | 160.00 | 123.83 | 132.88 | 87.67 |
| CAB Solution D | | 133.33 | | | | 133.33 | | |
| CAB Solution F | | | 100.00 | 100.00 | | | 100.00 | 100.00 |
| Polyester 1 | | | | 38.46 | | | | 38.46 |
| Solvent Blend F | 377.55 | 257.83 | 288.50 | 292.80 | 373.76 | 254.89 | 285.35 | 290.73 |
| Total | 580.16 | 557.83 | 564.15 | 561.98 | 577.35 | 555.64 | 561.82 | 560.45 |

TABLE 4

| Ingredient | BC34 | BC35 | BC36 | BC37 | BC38 | BC39 | BC40 | BC41 | BC42 | BC43 | BC44 | BC45 |
|---|---|---|---|---|---|---|---|---|---|---|---|---|
| Aluminum dispersion B | 43.59 | 43.59 | 43.59 | 43.59 | 43.59 | 43.59 | 43.59 | 43.59 | 43.59 | 43.59 | 43.59 | 43.59 |
| Polymer 8 | 159.14 | 123.17 | 132.16 | 87.19 | | | | | | | | |
| Polymer 9 | | | | | 157.44 | 121.85 | 130.75 | 86.26 | | | | |
| Polymer 10 | | | | | | | | | 159.71 | 123.61 | 132.64 | 87.51 |
| CAB Solution C | | 133.33 | | | | 133.33 | | | | 133.33 | | |

TABLE 4-continued

| Ingredient | BC34 | BC35 | BC36 | BC37 | BC38 | BC39 | BC40 | BC41 | BC42 | BC43 | BC44 | BC45 |
|---|---|---|---|---|---|---|---|---|---|---|---|---|
| CAB Solution E | | | 100.00 | 100.00 | | | 100.00 | 100.00 | | | 100.00 | 100.00 |
| Polyester 1 | | | | 38.46 | | | | 38.46 | | | | 38.46 |
| Solvent Blend F | 377.34 | 257.66 | 288.32 | 292.69 | 376.48 | 257.00 | 287.61 | 292.22 | 373.29 | 254.53 | 284.96 | 290.47 |
| Total | 580.07 | 557.75 | 564.07 | 561.93 | 577.51 | 555.77 | 561.95 | 560.53 | 576.59 | 555.06 | 561.19 | 560.03 |

TABLE 5

| Ingredient | BC46 | BC47 | BC48 | BC49 | BC50 | BC51 | BC52 | BC53 |
|---|---|---|---|---|---|---|---|---|
| Aluminum dispersion B | 43.59 | 43.59 | 43.59 | 43.59 | 43.59 | 43.59 | 43.59 | 43.59 |
| Polymer 11 | 159.65 | 123.57 | 132.59 | 87.48 | | | | |
| Polymer 12 | | | | | 159.62 | 123.54 | 132.56 | 87.46 |
| CAB Solution C | | 133.33 | | | | 133.33 | | |
| CAB Solution E | | | 100.00 | 100.00 | | | 100.00 | 100.00 |
| Polyester 1 | | | | 38.46 | | | | 38.46 |
| Solvent Blend F | 378.41 | 258.50 | 289.22 | 293.28 | 376.45 | 256.98 | 287.59 | 292.20 |
| Total | 581.65 | 558.99 | 565.40 | 562.81 | 579.66 | 557.44 | 563.74 | 561.71 |

TABLE 6

| Ingredient | BC54 | BC55 | BC56 | BC57 | BC58 | BC59 | BC60 | BC61 | BC62 | BC63 | BC64 | BC65 |
|---|---|---|---|---|---|---|---|---|---|---|---|---|
| Aluminum dispersion B | 43.59 | 43.59 | 43.59 | 43.59 | 43.59 | 43.59 | 43.59 | 43.59 | 43.59 | 43.59 | 43.59 | 43.59 |
| Polymer 13 | 161.84 | 125.26 | 134.41 | 88.68 | | | | | | | | |
| Polymer 14 | | | | | 159.14 | 123.17 | 132.16 | 87.19 | | | | |
| Polymer 15 | | | | | | | | | 162.35 | 125.65 | 134.83 | 88.95 |
| CAB Solution C | | 133.33 | | | | 133.33 | | | | 133.33 | | |
| CAB Solution E | | | 100.00 | 100.00 | | | 100.00 | 100.00 | | | 100.00 | 100.00 |
| Polyester 1 | | | | 38.46 | | | | 38.46 | | | | 38.46 |
| Solvent Blend F | 365.34 | 248.38 | 278.36 | 286.11 | 375.34 | 256.12 | 286.66 | 291.59 | 386.07 | 264.42 | 295.57 | 297.47 |
| Total | 570.77 | 550.56 | 556.36 | 556.84 | 578.07 | 556.21 | 562.41 | 560.83 | 592.01 | 566.99 | 573.99 | 568.47 |

The viscosity of the basecoat before addition of Solvent Blend F was measured with an appropriate Zahn cup in seconds.

The silver metallic basecoats were sprayed to hiding, per the application instructions used for CHROMAPREMIER® Basecoat, available from DuPont, Wilmington, Del., specified in the DuPont CHROMASYSTEM® Tech Manual. The basecoats were sprayed over 10.16 mm×30.48 mm×0.81 mm cold roll steel panels (B952 P60 DIW), available from ACT Laboratories, Hillsdale, Mich. The panels were coated with POWERCRON® 590, available from PPG, Pittsburgh, Pa., and then the panels were scuffed with Scotch-Brite 07447 General Purpose Hand Pads, then solvent wiped with FIRST KLEAN® 3900S wipes, available from DuPont, Wilmington, Del., and then applied with CHROMAPREMIER® 42440S 2K Premier Sealer available from DuPont, Wilmington, Del., per the application instructions in the CHROMASYSTEM® Tech Manual. Basecoats were clearcoated with CHROMAPREMIER® 7900S, available from DuPont, Wilmington, Del., per the application instructions in the DuPont CHROMASYSTEM® Tech Manual. Basecoat/clearcoat panels were flashed and then baked in a 140° F. oven for 30 minutes. Topcoated panels were allowed to dry for an additional 7 days prior to testing.

Color readings were recorded by a DuPont ChromaVision Custom Color MA 100B meter manufactured by X-Rite, Inc. of Grandville, Mich. The Near Specular Lightness (NSL) value and the flop value before and after the clear coat was applied are recorded in the tables below. High NSL value indicates good control of the aluminum flake orientation. The difference of NSL before and after clear coat (NSL delta) provides a measurement of "strike-in" property where the clear coat invaded the basecoat and disturbed the flake orientation and negatively impacted the NSL value.

Mottling was a visual test where the uniformity of the appearance on the finished panels was judged. Any undesired effects such as the "salt-and-pepper" like texture and/or gross patterns like the "tiger stripes" were considered in the ratings.

Mottling Ratings:
0=none
1=slight
2=moderate
3=severe

Gravelometer Testing:

Dry Chip:

Gravelometer testing was done per ASTM-D-3170-87 using a 55 degree panel angle, with panels and stones kept in the freezer for a minimum of two hours prior to chipping (1 pint stones & 3 pints stones).

Wet Chip:

After air drying for 7 days after the 140° F.×30 minute bake, the panels were exposed in a humidity cabinet per ASTM-D-2247-92 at 100% relative humidity for 96 hours and then gravelometer testing was done per ASTM-D-3170-87 using a 55 degree panel angle, with panels and stones kept in the freezer for a minimum of two hours prior to chipping (1 pint stones & 3 pints stones).

Humidity Cabinet Testing:

Testing was done after 96 hours exposure (ASTM D2247-92 testing water resistance of coatings in 100% relative humidity)—X-hatch adhesion, grid-hatch adhesion, and blistering per ASTM D3359-92A (measuring adhesion by tape test) and ASTM D714-87 (blistering). Panels were tested for X-hatch and grid-hatch adhesion before exposure, immediately after removal from the humidity cabinet (panels were dried with towels first) and after 24 hours recovery (after humidity cabinet exposure).

Rating System:

An overall qualitative rating (see below) was made on the chipping of the coatings from the "Dry Chip" and "Wet Chip" tests. An overall qualitative rating was made on the X-hatch and grid-hatch adhesion of the coatings from the "Humidity Cabinet Testing". The three scores were added together and listed in the tables below in the column titled "Film property". This score gives an overall assessment of the durability of the coating. The highest score, corresponding to the worst performance, in the rating system is 9 for basecoats 1-17 and for basecoats 54-65. For basecoats 18-53, the highest score, corresponding to the worst performance, is 15.

The same qualitative rating system was applied to the "Peeling" performance where the observations were focused on any significant area of any layer(s) had peeled off from the testing procedure. The peeling most often occurred between the basecoat and the clear coat. The total score is listed in the tables below in the column titled "Peeling". The highest score, corresponding to the worst performance, in the rating system is 9 for basecoats 1-17 (Table 7) and for basecoats 54-65 (Table 11). For basecoats 18-53 (Tables 8-10), the highest score corresponding to the worst performance is 15.

For the individual panels the rating system below was used for the basecoats 1-17 (BC1-BC17) and basecoats 54-65 (BC54-BC65).

Ratings: 0=none (no loss of adhesion)
1=slight
2=moderate
3=severe

An additional 0.5 was added to further differentiate the results of between panels when needed.

The rating system below was used for basecoats 18-53 (BC18-BC53).

Ratings: 0=none (no loss of adhesion)
1=very slight
2=slight
3=moderate
4=severe
5=very severe An additional 0.5 was added to further differentiate the results between panels when needed.

The results are summarized in the tables below.

TABLE 7

| Test | Film property | Peeling | NSL BC alone | NSL BC/CC | NSL delta (BC/CC-BC) | Flop BC alone | Flop BC/CC | Mottling | Zahn cup | sec |
|---|---|---|---|---|---|---|---|---|---|---|
| BC 1 | 6.0 | 1.0 | 131.79 | 123.79 | −8.00 | 12.98 | 10.94 | 1+ | 2 | 19.46 |
| BC 2 | 6.0 | 0.0 | 129.57 | 118.96 | −10.61 | 11.35 | 9.36 | 1+ | 2 | 20.31 |
| BC 3 | 5.5 | 0.0 | 132.60 | 123.04 | −9.57 | 12.35 | 10.50 | 2 | 2 | 22.62 |
| BC 4 | 4.5 | 3.0 | 136.11 | 128.09 | −8.01 | 15.40 | 12.40 | 1− | 3 | 19.67 |
| BC 5 | 5.5 | 5.0 | 114.61 | 96.90 | −17.70 | 8.09 | 5.82 | 2+ | 2 | 20.44 |
| BC 6 | 3.0 | 3.0 | 128.94 | 119.15 | −9.79 | 12.45 | 10.13 | 1 | 2 | 24.86 |
| BC 7 | 8.0 | 6.0 | 89.70 | 81.90 | −7.79 | 4.74 | 4.39 | 2 | 1 | 26.37 |
| BC 8 | 8.0 | 6.0 | 124.26 | 107.33 | −16.92 | 10.76 | 7.99 | 2 | 2 | 20.41 |
| BC 9 | 5.0 | 1.5 | 111.68 | 97.11 | −14.57 | 8.38 | 6.77 | 3+ | 2 | 21.46 |
| BC 10 | 7.0 | 6.0 | 102.20 | 84.94 | −17.26 | 6.29 | 4.27 | 3 | 2 | 19.27 |
| BC 11 | 6.0 | 5.0 | 98.82 | 90.11 | −8.71 | 6.54 | 5.41 | 3+ | 2 | 19.40 |
| BC 12 (comparative example) | 7.0 | 6.0 | 128.58 | 112.17 | −16.41 | 10.62 | 7.73 | 1 | 1 | 23.72 |
| BC 13 (comparative example) | 3.5 | 1.0 | 94.06 | 87.21 | −6.85 | 5.09 | 4.94 | 3+ | 2 | 24.65 |
| BC 14 (comparative example) | 7.0 | 9.0 | 97.83 | 83.51 | −14.32 | 6.00 | 4.42 | 3+ | 1 | 25.93 |
| BC 15 (comparative example) | 4.0 | 2.0 | 98.67 | 83.08 | −15.60 | 6.02 | 4.33 | 3+ | 1 | 28.54 |
| BC 16 (comparative example) | 5.0 | 5.0 | 126.92 | 111.02 | −15.90 | 10.20 | 7.44 | 1+ | 2 | 22.47 |
| BC 17 (comparative example) | 5.0 | 5.0 | 117.02 | 101.39 | −15.63 | 8.24 | 6.24 | 2 | 2 | 23.54 |

The results in table 7 indicate that the performance is dependent on the basecoat formula. Basecoats 12-17 containing comparative polymer 3, having no carboxylic acid or polyether groups as required by this invention are present, on the whole showed a much more severe strike-in and mottling problems. Basecoats 1-6 containing polymer 1, having the highest level of 8% of carboxylic acid groups and 2% polyether containing monomers showed the best color data in this set including the improved strike-in resistance and mottle control.

TABLE 8

| Test | Film property | Peeling | NSL BC alone | NSL BC/CC | NSL delta (BC/CC-BC) | Flop BC alone | Flop BC/CC | Mottling | Zahn cup | sec |
|---|---|---|---|---|---|---|---|---|---|---|
| BC 18 | 7.0 | 0.0 | 124.26 | 81.25 | −43.01 | 11.23 | 4.19 | 3 | 1 | 32.73 |
| BC 19 | 8.0 | 1.0 | 108.19 | 86.30 | −21.88 | 7.32 | 4.60 | 3 | 1 | 35.08 |
| BC 20 | 8.0 | 2.0 | 116.80 | 79.94 | −36.86 | 8.85 | 3.66 | 2 | 2 | 20.91 |
| BC 21 | 8.0 | 3.0 | 109.73 | 80.70 | −29.03 | 7.48 | 3.36 | 2 | 2 | 23.02 |
| BC 22 | 8.0 | 1.0 | 137.37 | 116.16 | −21.20 | 14.75 | 9.21 | 1 | 1 | 31.88 |
| BC 23 | 8.0 | 1.0 | 138.96 | 124.91 | −14.05 | 15.71 | 11.04 | 1 | 1 | 34.92 |
| BC 24 | 8.0 | 1.0 | 100.21 | 77.82 | −22.38 | 6.98 | 3.49 | 2 | 2 | 21.06 |
| BC 25 | 7.0 | 4.0 | 90.32 | 72.84 | −17.49 | 4.99 | 2.33 | 3 | 2 | 24.35 |
| BC 26 | 5.0 | 2.0 | 138.08 | 124.21 | −13.87 | 15.05 | 10.93 | 0 | 1 | 29.67 |
| BC 27 | 12.0 | 4.0 | 109.59 | 98.68 | −10.91 | 7.82 | 6.28 | 3 | 1 | 31.45 |
| BC 28 | 11.0 | 3.0 | 92.03 | 91.88 | −0.15 | 5.21 | 5.37 | 3 | 2 | 22.18 |
| BC 29 | 2.0 | 0.0 | 91.12 | 81.75 | −9.37 | 4.66 | 3.43 | 3 | 2 | 23.41 |
| BC 30 (comp example) | 5.0 | 0.0 | 131.70 | 88.91 | −42.78 | 12.95 | 5.43 | 1 | 1 | 28.76 |
| BC 31 (comp example) | 7.0 | 1.0 | 115.29 | 88.50 | −26.79 | 8.96 | 4.86 | 3 | 1 | 30.35 |
| BC 32 (comp example) | 11.0 | 4.0 | 106.57 | 86.54 | −20.03 | 7.47 | 5.59 | 3 | 2 | 19.24 |
| BC 33 (comp example) | 10.0 | 4.0 | 104.82 | 92.54 | −12.29 | 6.57 | 5.27 | 2 | 2 | 21.07 |

The data in Table 8 consists of polymers having the same composition at different molecular weight. Basecoats 18-21 contain polymer 4, basecoats 22-25 contain polymer 5, basecoats 26-29 contain polymer 6 and basecoats 30-33 contain comparative polymer 7. Polymer 4 to 6 contain 3% carboxylic acid functional monomer and 2% polyether functional monomer and comparative polymer 7 is a polymer having 3% carboxylic acid functional monomers, but no polyether functional monomers. Comparative Polymer 7 also had the highest molecular weight, which was expected to have a positive effect on strike-in and mottling properties. While some variation of the spray results are expected, the Comparative example, BC 30-33, showed poorer performance especially in comparison to Polymer 5 and 6, BC 22 to 29.

TABLE 9

| Test | Film property | Peeling | NSL BC alone | NSL BC/CC | NSL delta (BC/CC-BC) | Flop BC alone | Flop BC/CC | Mottling | Zahn Cup | sec |
|---|---|---|---|---|---|---|---|---|---|---|
| BC 34 | 8.0 | 3.0 | 127.24 | 102.33 | −24.91 | 10.63 | 6.33 | 1 | 1 | 30.76 |
| BC 35 | 12.0 | 10.0 | 135.75 | 95.86 | −39.89 | 12.99 | 5.51 | 2 | 1 | 35.24 |
| BC 36 | 12.0 | 4.0 | 124.90 | 99.53 | −25.38 | 10.47 | 6.47 | 3 | 2 | 22.85 |
| BC 37 | 12.0 | 6.0 | 94.24 | 91.52 | −2.72 | 5.32 | 4.97 | 3 | 2 | 25.1 |
| BC 38 | 10.0 | 2.0 | 122.43 | 113.05 | −9.38 | 10.26 | 8.71 | 2 | 1 | 30.74 |
| BC 39 | 11.0 | 8.0 | 102.35 | 84.36 | −17.99 | 6.44 | 3.99 | 2 | 1 | 33.81 |
| BC 40 | 11.0 | 3.0 | 87.54 | 80.45 | −7.09 | 4.80 | 3.80 | 3 | 2 | 22.45 |
| BC 41 | 12.0 | 8.0 | 83.10 | 69.15 | −13.95 | 4.04 | 1.82 | 3+ | 2 | 23.68 |
| BC 42 (comp example) | 8.0 | 0.0 | 69.18 | 73.27 | 4.09 | 2.17 | 2.23 | 3+ | 1 | 27.65 |
| BC 43 (comp example) | 11.0 | 3.0 | 96.14 | 77.97 | −18.17 | 5.76 | 3.07 | 3 | 1 | 30.92 |
| BC 44 (comp example) | 10.0 | 2.0 | 100.54 | 91.23 | −9.31 | 6.58 | 4.78 | 3 | 2 | 19.21 |
| BC 45 (comp example) | 12.0 | 5.0 | 86.95 | 70.34 | −16.62 | 4.14 | 1.78 | 3 | 2 | 20.34 |

There is a clear trend in the results of Table 9. Basecoats 34-37, containing polymer 8 with 4% carboxylic acid group containing monomers and 4% polyether containing monomers, produced the best color data including NSL, flop, and mottle control. Basecoats 38-41, containing polymer 9, having 3% carboxylic acid group containing monomers and 4% polyether containing monomers are good, but not as good as basecoats containing polymer 8. However, in basecoats 42-45, containing comparative polymer 10 having 0% polyether containing monomers, the color performance suffered.

TABLE 10

| Test | Film property | Peeling | NSL BC alone | NSL BC/CC | NSL delta (BC/CC-BC) | Flop BC alone | Flop BC/CC | Mottling | Zahn Cup | sec |
|---|---|---|---|---|---|---|---|---|---|---|
| BC 46 | 5.0 | 1.0 | 123.66 | 81.25 | −42.40 | 9.50 | 3.31 | 2 | 1 | 22.35 |
| BC 47 | 12.0 | 10.0 | 137.73 | 121.89 | −15.84 | 15.72 | 10.97 | 1− | 2 | 24.37 |
| BC 48 | 8.0 | 0.0 | 91.74 | 66.59 | −25.15 | 5.04 | 1.74 | 3 | 2 | 23.22 |
| BC 49 | 7.0 | 3.0 | 120.80 | 85.55 | −35.25 | 8.83 | 3.90 | 2 | 1 | 28.64 |
| BC 50 | 7.0 | 0.0 | 74.08 | 59.45 | −14.63 | 3.28 | 1.04 | 3 | 1 | 29.74 |
| BC 51 | 13.0 | 8.0 | 94.08 | 71.08 | −22.99 | 5.92 | 2.36 | 3 | 1 | 31.63 |
| BC 52 | 11.0 | 8.0 | 90.89 | 68.53 | −22.36 | 4.95 | 2.03 | 3 | 2 | 20.15 |
| BC 53 | 11.0 | 4.0 | 92.08 | 68.15 | −23.94 | 4.90 | 1.73 | 3 | 2 | 21.03 |

The results of Table 10 support the importance of the combination of the acid groups and the ethylene oxide groups on the polymer chain and the effect of the concentration of the acid groups. Basecoats 46-49, containing polymer 11 with 3% carboxylic acid group containing monomers and 4% polyether containing monomers clearly outperformed basecoats 50-53, containing polymer 12 with 3% acid group containing monomers and 2% polyether containing monomers at comparable molecular weight.

TABLE 11

| Test | Film property | Peeling | NSL BC alone | NSL BC/CC | NSL delta (BC/CC-BC) | Flop BC alone | Flop BC/CC | Mottling | Zahn Cup | sec |
|---|---|---|---|---|---|---|---|---|---|---|
| BC 54 | 3.0 | 0.0 | 139.52 | 90.10 | −49.43 | 15.69 | 4.45 | 1+ | 1 | 31.03 |
| BC 55 | 4.5 | 0.0 | 124.43 | 102.91 | −21.52 | 10.40 | 6.72 | 3 | 2 | 21.13 |
| BC 56 | 4.0 | 0.0 | 112.16 | 94.58 | −17.58 | 8.17 | 6.24 | 3+ | 2 | 22.1 |
| BC 57 | 5.5 | 1.0 | 95.29 | 87.38 | −7.91 | 5.38 | 4.49 | 3+ | 2 | 19.98 |
| BC 58 | 6.5 | 2.0 | 97.83 | 90.14 | −7.70 | 6.07 | 5.35 | 3+ | 1 | 33.57 |
| BC 59 | 7.5 | 3.0 | 104.15 | 89.54 | −14.61 | 6.88 | 5.08 | 3+ | 2 | 23.68 |
| BC 60 | 7.5 | 3.0 | 104.88 | 85.59 | −19.29 | 7.06 | 4.45 | 3+ | 2 | 23.95 |
| BC 61 | 7.0 | 2.5 | 99.93 | 82.08 | −17.85 | 5.93 | 3.89 | 3+ | 2 | 21.43 |
| BC 62 | 7.0 | 2.5 | 122.90 | 102.37 | −20.53 | 10.39 | 7.34 | 3+ | 1 | 32.97 |
| BC 63 | 7.5 | 3.0 | 111.93 | 88.39 | −23.54 | 8.48 | 5.21 | 3 | 2 | 21.95 |
| BC 64 | 7.0 | 3.0 | 103.03 | 88.93 | −14.10 | 6.82 | 5.44 | 3 | 2 | 22.36 |
| BC 65 | 7.0 | 3.0 | 94.65 | 88.13 | −6.52 | 5.32 | 5.07 | 3+ | 2 | 20.47 |

In this set, basecoats 54-57 containing polymer 13 with 6% carboxylic acid group containing monomers and 2% polyether containing monomers showed the best film properties in both the chip resistance rating and the peeling rating in comparison to basecoats 58-61 containing polymer 14, 4% carboxylic acid groups and 4% polyether containing monomers, and basecoats 62-65 containing polymer 15, 3% carboxylic acid groups and 4% polyether containing monomers.

What is claimed is:

1. A solventborne basecoating composition comprising;
   i. at least one solventborne acrylic copolymer which is a random copolymer comprising;
      1. 2 percent to 10 percent by weight of a carboxylic acid monomer;
      2. 1 percent to 5 percent of a polyether functional monomer, wherein the percents by weight are based on the total weight of the acrylic copolymer;
   ii. pigment; and
   iii. organic solvent, and wherein the solventborne basecoat composition is substantially free from water.

2. The solventborne basecoating composition of claim 1 wherein the carboxylic acid functional monomer is selected from the group consisting of acrylic acid, methacrylic acid and a combination thereof.

3. The solventborne basecoating composition of claim 1 wherein the polyether functional monomer is $H_2C\!\!=\!\!C(R)C(O)O\!\!-\!\!(XO)_n\!\!-\!\!R1$; wherein R is H or $CH_3$; X is an alkyl group having in the range of from 2 to 4 carbon atoms; n is from 2 to 10; and R1 is H or an alkyl group having in the range of from 1 to 6 carbon atoms.

4. The solventborne basecoating composition of claim 1 wherein the polyether functional monomer is ethoxytriethyleneglycol methacrylate or ethoxytriethyleneglycol acrylate.

5. The solventborne basecoat composition of claim 1 wherein the weight average molecular weight of the acrylic copolymer is in the range of from 25,000 to 55,000.

6. The solventborne basecoat of claim 1 wherein the acrylic copolymer further comprises monomers selected from the group consisting of styrene, alkyl acrylates, alkyl methacrylates, hydroxy alkyl acrylates, hydroxy alkyl methacrylates and a combination thereof.

7. A method for coating a substrate comprising the step of applying a solventborne coating composition to a substrate wherein the coating composition comprises;
   i. at least one solventborne acrylic copolymer which is a random copolymer comprising;
      1. 2 percent to 10 percent by weight of a carboxylic acid monomer;
      2. 1 percent to 5 percent of a polyether functional monomer, wherein the percents by weight are based on the total weight of the acrylic copolymer;

ii. pigment; and iii. organic solvent, and wherein the solventborne basecoat composition is substantially free from water.

8. The method of claim 7 wherein the carboxylic acid functional monomer is selected from the group consisting of acrylic acid, methacrylic acid and a combination thereof.

9. The method of claim 7 wherein the polyether functional monomer is $H_2C=C(R)C(O)O-(XO)_n-R1$; wherein R is H or CH3; X is an alkyl group having in the range of from 2 to 4 carbon atoms; n is from 2 to 10; and R1 is H or an alkyl group having in the range of from 1 to 6 carbon atoms.

10. The method of claim 7 wherein the polyether functional monomer is ethoxytriethyleneglycol methacrylate or ethoxytriethyleneglycol acrylate.

11. The method of claim 7 wherein the weight average molecular weight of the acrylic copolymer is in the range of from 25,000 to 55,000.

12. The method of claim 7 wherein the acrylic copolymer further comprises monomers selected from the group consisting of styrene, alkyl acrylates, alkyl methacrylates, hydroxy alkyl acrylates, hydroxy alkyl methacrylates and a combination thereof.

13. The method of claim 7 further comprising applying a layer of a clearcoat composition over the applied layer of solventborne coating composition.

14. The method of claim 12 wherein the layer of solventborne basecoat composition is flash dried prior to applying the layer of clearcoat composition.

15. A substrate coated by a layer of a basecoat composition said basecoating composition comprising;

i. at least one solventborne acrylic copolymer which is a random copolymer comprising;

1. 2 percent to 10 percent by weight of a carboxylic acid monomer;

2. 1 percent to 5 percent of a polyether functional monomer, wherein the percents by weight are based on the total weight of the acrylic copolymer;

ii. pigment; and iii. organic solvent, and wherein the solventborne basecoat composition is substantially free from water.

16. The substrate of claim 15 wherein the layer of the basecoat composition is further coated by a layer of a clearcoat composition.

17. The substrate of claim 15 wherein the basecoat composition is uncrosslinked or crosslinked.

18. The substrate of claim 15 wherein the carboxylic acid functional monomer is selected from the group consisting of acrylic acid, methacrylic acid and a combination thereof.

19. The substrate of claim 15 wherein the polyether functional monomer is $H_2C=C(R)C(O)O-(XO)_n-R1$; wherein R is H or CH3; X is an alkyl group having in the range of from 2 to 4 carbon atoms; n is from 2 to 10; and R1 is H or an alkyl group having in the range of from 1 to 6 carbon atoms.

20. The substrate of claim 15 wherein the polyether functional monomer is ethoxytriethyleneglycol methacrylate or ethoxytriethyleneglycol acrylate.

21. The substrate of claim 15 wherein the weight average molecular weight of the acrylic copolymer is in the range of from 25,000 to 55,000.

22. The substrate of claim 15 wherein the acrylic copolymer further comprises monomers selected from the group consisting of styrene, alkyl acrylates, alkyl methacrylates, hydroxy alkyl acrylates, hydroxy alkyl methacrylates and a combination thereof.

\* \* \* \* \*